United States Patent [19]

Peruso

[11] Patent Number: 5,330,213
[45] Date of Patent: Jul. 19, 1994

[54] FIFTH WHEEL DEVICE FOR RACKABLE SWITCHGEAR UNITS

[75] Inventor: Michael L. Peruso, Knightdale, N.C.

[73] Assignee: Siemens Energy & Automation, Inc., Alpharetta, Ga.

[21] Appl. No.: 942,553

[22] Filed: Sep. 9, 1992

[51] Int. Cl.⁵ ............................................. B60S 9/08
[52] U.S. Cl. .................................... 280/43.2; 280/767
[58] Field of Search ................. 280/43.2, 43.12, 43.17, 280/43.18, 475, 292, 6.11, 767, 78, 83, 84, 43.21, 43.23; 254/420, 424, 425, 427, 418

[56] References Cited

U.S. PATENT DOCUMENTS

| | | | |
|---|---|---|---|
| 2,833,549 | 5/1958 | Burch | 280/43.2 |
| 3,041,083 | 6/1962 | Blanc | 280/43.21 |
| 3,423,101 | 1/1969 | Boeye | 280/43.12 |
| 3,540,632 | 11/1970 | Clingan | 280/767 |
| 3,576,333 | 4/1971 | Danielson et al. | 280/767 |
| 4,516,901 | 5/1985 | Riedl | 280/43.21 |

FOREIGN PATENT DOCUMENTS 1412915 8/1965 France ................................ 280/767
2178708 2/1987 United Kingdom .................. 280/84

OTHER PUBLICATIONS

Fulton Performance Products, Marine, A-Frame, AG. & Industrial Jacks. Brochure No. JC 91.

Primary Examiner—Margaret A. Focarino
Assistant Examiner—Kevin Hurley
Attorney, Agent, or Firm—Peter A. Luccarelli, Jr.

[57] ABSTRACT

A steerable and rackable electrical apparatus system including a wheeled rackable electrical apparatus (10). The system allows steerable movement of an unracked apparatus (10) that has been removed from a switchgear cabinet. The system includes a device (20) with a lifting bracket (22) selectively attachable and detachable from the electrical apparatus (10); and a steerable, wheeled, self-supporting lifting device (30) for lifting a portion of the electrical apparatus (10) to a lifted position and for supporting weight of the lifted apparatus (10) without operator lifting effort. The lifting device (30) may be screw jack with a castered wheel (38) that is coupled to the lifting bracket (22).

16 Claims, 3 Drawing Sheets

FIFTH WHEEL DEVICE FOR RACKABLE SWITCHGEAR UNITS

BACKGROUND OF THE INVENTION

The present direction is directed to rackable switchgear draw-out units for electrical distribution systems and in particular devices used in conjunction with unracked draw-out units, which allow lifting of a portion of the draw-out unit and maneuverable steering of the unit when it is racked out of a switchgear cabinet.

Rackable switchgear draw-out units, such as draw-out circuit breakers, are commonly used in the electrical distribution and control fields. When the switchgear is energized with electrical current, the draw-out unit is housed within a cabinet and connected to a busway system within the cabinet for transmission of the power. The draw-out units can be removed from the cabinet in a generally straight line by way of fixed, non-steerable but rotatively-mounted wheels or rollers after power to the cabinet is shut down and appropriate safety measures well known in the art are taken to inhibit the likelihood of injury to service personnel.

In field installations, it is often desirable to maneuver wheeled draw-out units after they have been removed from the switchgear cabinets, so that they can be serviced, replaced and the like. It is difficult to maneuver the draw-out unit in other than a straight line, because its fixed wheels are not steerable.

In the past, service personnel have attempted to maneuver draw-out units with modified handtrucks having a pair of rotatively mounted wheels on an axle which is attached to a generally L-shaped chassis. When operated, the short leg of the L-shaped chassis is placed under the floorpan of the draw-out unit. The operator then lifts a pair of the draw-out unit wheels off the ground by rocking down on the long leg of the L-shaped chassis. As is familiar to handtruck operators, the pair of axled wheels on such a device are really not very maneuverable. Also, the operator must continuously exert downward rocking pressure on the handtruck in order to maintain the draw-out unit wheels in a lifted and steerable position. There is a well-recognized need in the industry for lifting and maneuvering devices for switchgear draw-out units that can be easily steered and which are self supporting so as to reduce operator physical effort necessary to support the weight of the lifted draw-out unit.

It is an object of the present invention to create a fifth wheel device which increases maneuverability of switchgear draw-out units when the latter are being moved around outside switchgear cabinets.

It is another object of the present invention to create a fifth wheel device which is self-supporting when a draw-out apparatus which is attached thereto is in a lifted position, so as to reduce operator physical exertion.

SUMMARY OF THE INVENTION

The above-recited needs and objects have been achieved by the fifth wheel device for rackable switchgear of the present invention.

One embodiment of the present invention is directed to a steerable and rackable electrical apparatus system including a wheeled rackable electrical apparatus. The system allows steerable movement of an unracked apparatus that has been removed from a switchgear cabinet. The system includes a device with a lifting bracket selectively attachable and detachable from the electrical apparatus. The device also includes a steerable, wheeled, self-supporting lifting device for lifting a portion of the electrical apparatus to a lifted position and for supporting weight of the lifted apparatus without operator lifting effort. The lifting device may be a castered screw jack that is coupled to the lifting bracket.

Another embodiment of the present invention is directed to a steering device for rackable electrical apparatus including a lifting bracket selectively attachable and detachable from an electrical apparatus; and a steerable, wheeled, self-supporting means for lifting a portion of an electrical apparatus to a lifted position and for supporting weight of the lifted apparatus without operator lifting effort, coupled to the lifting bracket.

The present invention is also directed to a steering device for a wheeled, rackable electrical apparatus including a lifting bracket selectively attachable and detachable from an electrical apparatus; and a steerable, wheeled, screw jack coupled to the lifting bracket for lifting a portion of an electrical apparatus to a lifted position and for supporting weight of the lifted apparatus without operator lifting effort.

DESCRIPTION OF THE PREFERRED EMBODIMENTS

Figure 1:
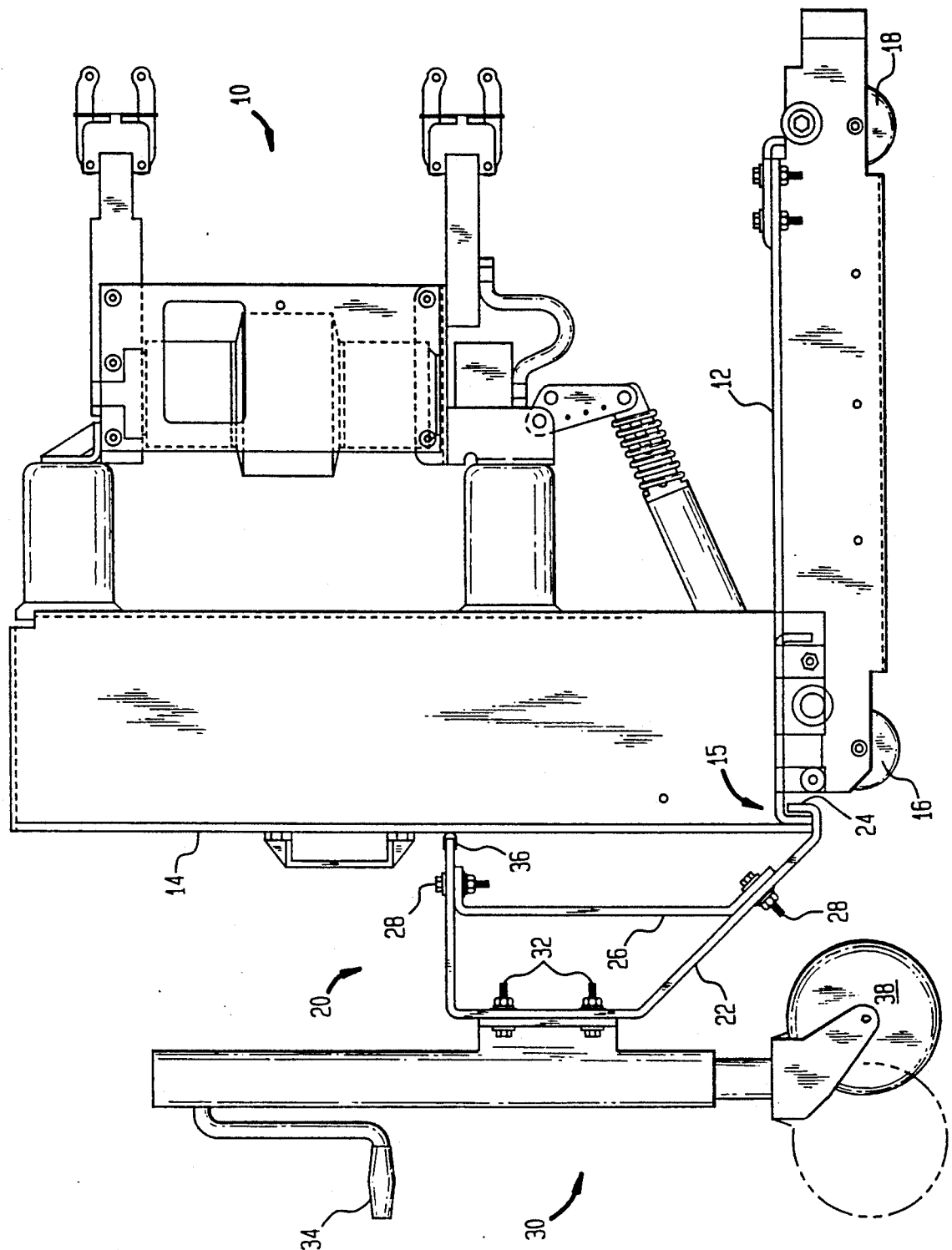
FIG. 1 shows a fifth wheel device for rackable switchgear of the present invention attached to a draw-out unit with the draw-out unit in a lifted, steerable position.
Figure 4:
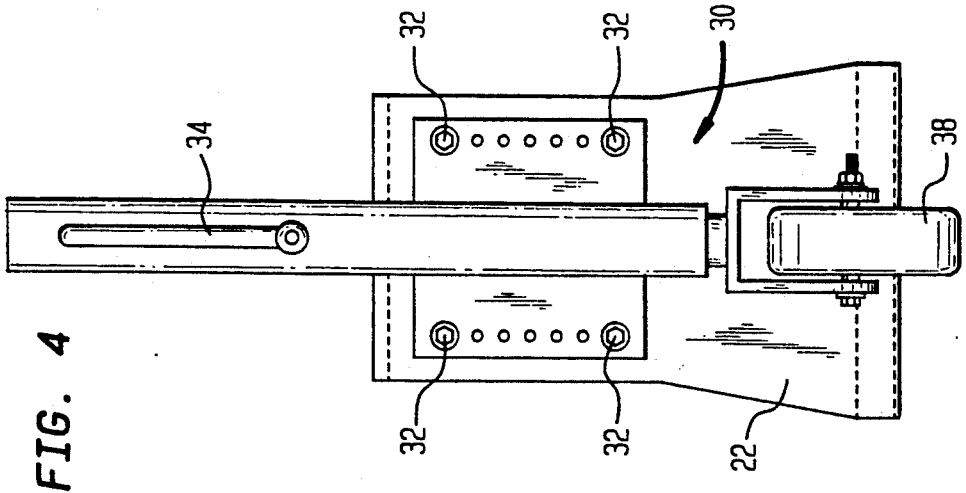
FIG. 4 is a back view of the device of FIG. 1.
Figure 3:
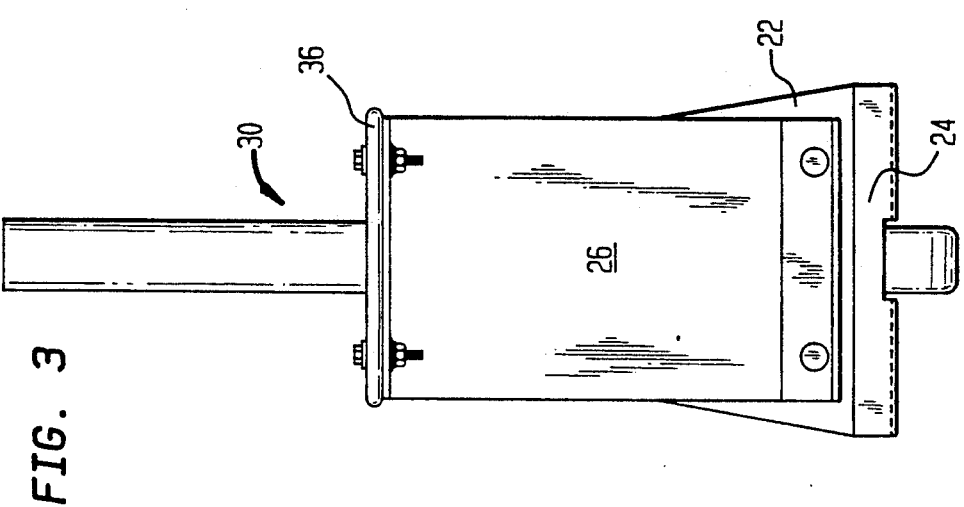
FIG. 3 is a front view of the device of FIG. 1.
Figure 2:
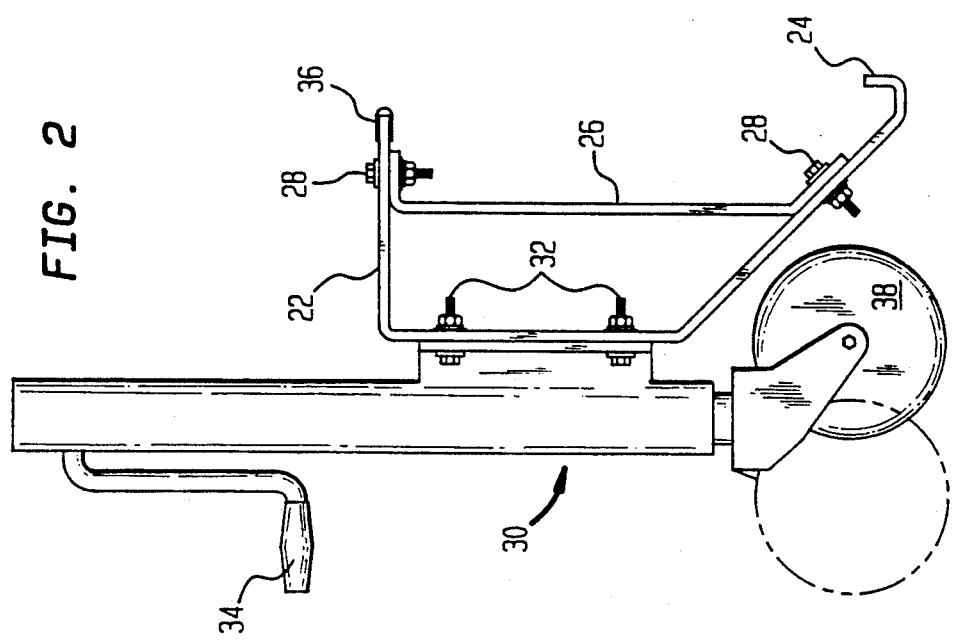
FIG. 2 is a side view of the device of FIG. 1.

Referring generally to the figures, FIG. 1 shows the fifth wheel device for rackable switchgear units of the present invention in operation for lifting and steering a draw-out circuit breaker. FIGS. 2-5 show the device in greater detail.

In FIG. 1, the draw-out unit is a Type GMI draw-out circuit breaker 10, sold by the Electrical Apparatus Division of Siemens Energy & Automation, Inc. Breaker 10 has a bottom pan 12 and a front face 14 which form a draw-out unit front lip 15 at their point of joinder. The breaker unit 10 has a pair of front wheels 16 and a pair of rear wheels 18 which are rotatively mounted thereto, in order to allow movement of the breaker 10 from a switchgear cabinet (not shown) in known draw-out fashion. While a Siemens Type GMI breaker has been shown and described herein, it should be understood that any known type of draw-out switchgear unit can be maneuvered by the present invention.

Figure 5:
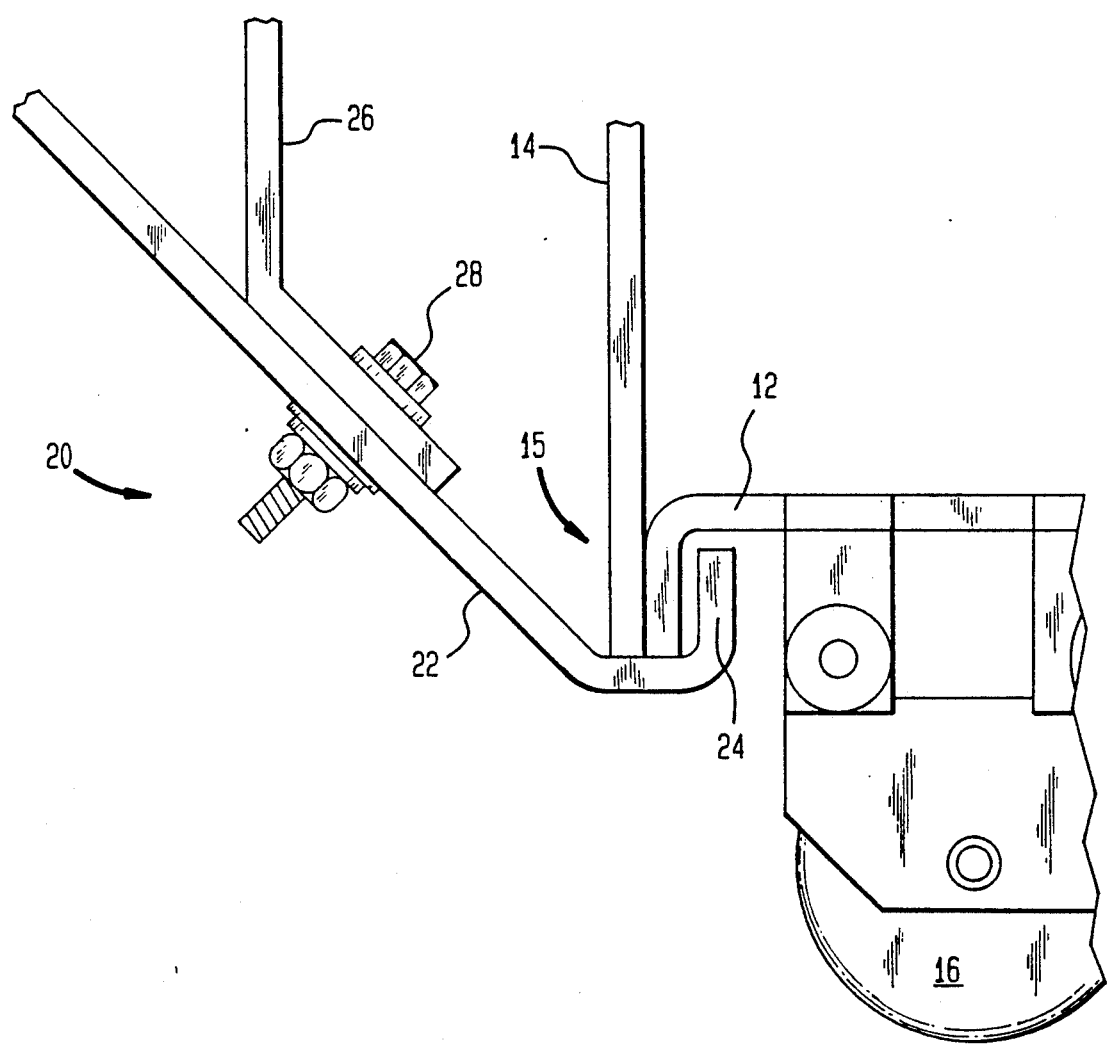
FIG. 5 is a partial detailed side view of FIG. 1, showing attachment of the device to the draw-out unit.

As can be seen clearly in FIGS. 1-5, the fifth wheel device 20 of the present invention has a lifting bracket 22 which forms a lifting bracket lip 24 for engagement with the draw-out unit lip 15; see particularly FIGS. 1 and 5. The device 20 preferably has a brace 26 attached to the lifting bracket 22 by fasteners 28. The lifting bracket 22 and brace 26 are preferably formed from sheet steel for low cost construction, but it should be understood that other materials and fabrication techniques known in the art can be used to manufacture those components, such as for example cast or welded members.

The fifth wheel device 20 has a steerable, wheeled, self-supporting mechanism 30 for lifting a portion of the electrical apparatus to a lifted position as shown in FIG. 1 and for maintaining the apparatus in a lifted position without operator effort to support the weight of the apparatus. The lifting mechanism 30 is desirably a castered screw jack as shown. It is contemplated that any commercially available castered screw jack which meets the load specifications required for lifting the front portion of the draw-out unit 10 may be utilized in conjunction with this invention. One suitable supplier of castered screw jacks is Fulton Performance Products, Inc. of Milwaukee, Wis., which are sold under model designations TJ1222 and TJ712. It is also contemplated that other types of lifting mechanisms can be utilized in the present invention, so long as they have some form of one or more steerable wheels, such as pawl-and-ratchet jacks or hydraulic jacks.

The jack lifting mechanism 30 is connected to the lifting bracket 22 with fasteners 32. The jack 30 also has a cranking handle 34 that can also be utilized as a steering tiller for pulling the lifted draw-out unit 10 and fifth wheel device 20. Bumper 36 is attached to the portion of lifting bracket 22 which contacts the front face 14 of the switchgear draw-out unit 10, so as to avoid marring the unit 10's finish. The bumper 36 can be constructed of any relatively soft, non-marring material, such as synthetic rubber, plastic or hard felt.

The fifth wheel device 20 of the present invention is used by insuring that the jack 30 is in a lowered position. Lifting bracket lip 24 is engaged with the front lip 15 of the draw-out breaker 10 that was already de-energized and reciprocated out of the switchgear cabinet and the bumper 36 is abutted against the front face 16 of the breaker. Please refer to FIG. 1. Next, the operator actuates the jack 30 by cranking handle 34, in order to lift the front wheels 16 of the draw-out unit 10 off the ground. The jack 30 is self supporting and maintains the front wheels 16 in a lifted position without operator physical effort. Once the front wheels 16 of the draw-out unit 10 are off the ground, the jack 30's castered wheel 38 easily maneuvers the switchgear unit 10 to any desired location.

While the preferred embodiment of the present invention has been described herein, it should be understood that it is in no way intended to limit the scope of this invention as set forth in the claims herein.

What is claimed is:

1. A steerable, rackable electrical apparatus system comprising:
    a wheeled rackable electrical apparatus;
    a lifting bracket selectively attachable and detachable from the electrical apparatus; and
    a steerable, wheeled, self-supporting means for lifting a portion of the electrical apparatus to a lifted position and for supporting weight of the lifted apparatus without operator lifting effort, coupled to the lifting bracket.

2. The system of claim 1, wherein the means for lifting is a screw jack having a castered wheel.

3. The system of claim 1, wherein the rackable electrical apparatus is a draw-out circuit breaker unit.

4. The system of claim 1, wherein the lifting bracket has a lip projecting therefrom for selective attachment and detachment with the electrical apparatus.

5. The system of claim 1, wherein the lifting bracket has a generally vertically aligned central portion for attachment to the means for lifting, a generally horizontally aligned first flange projecting generally normal from the central portion and a second flange projecting forwardly and downwardly from the central portion, the second flange including a lip projecting therefrom for selective attachment and detachment with the electrical apparatus.

6. The system of claim 5, further comprising a brace coupled to the first and second flanges of the lifting bracket and oriented generally parallel to the central portion thereof.

7. A steering device for a wheeled, rackable electrical apparatus comprising:
    a lifting bracket selectively attachable and detachable from an electrical apparatus having at least two fixed position wheels; and
    a steerable, wheeled, screw jack coupled to the lifting bracket for lifting a portion of the electrical apparatus to a lifted position and for supporting weight of the lifted apparatus without operator lifting effort;
    the single steering device in cooperation with the electrical apparatus wheels allowing steering of the apparatus when in the lifted position.

8. The device of claim 7, wherein the lifting bracket has a lip projecting therefrom for selective attachment and detachment with the electrical apparatus.

9. A steering device for a wheeled, rackable electrical apparatus comprising:
    a steerable, wheeled, screw jack for lifting a portion of an electrical apparatus to a lifted position and for supporting weight of the lifted apparatus without operator lifting effort; and
    a lifting bracket having a generally vertically aligned central portion attached to the jack, a generally horizontally aligned first flange projecting generally normal from the central portion and a second flange projecting forwardly and downwardly from the central portion, the second flange including a lip projecting therefrom for selective attachment and detachment with the electrical apparatus.

10. The device of claim 9, further comprising a brace coupled to the first and second flanges of the lifting bracket and oriented generally parallel to the central portion thereof.

11. A steering device for rackable electrical apparatus comprising:
    a lifting bracket selectively attachable and detachable from an electrical apparatus having at least two fixed position wheels; and
    a steerable, wheeled, self-supporting means for lifting a portion of the electrical apparatus to a lifted position and for supporting weight of the lifted electrical apparatus without operator lifting effort, coupled to the lifting bracket;
    the single steering device in cooperation with the apparatus wheels allowing steering of the apparatus when in the lifted position.

12. The device of claim 11, wherein the means for lifting is a screw jack having a castered wheel.

13. The device of claim 11, wherein the lifting bracket has a lip projecting therefrom for selective attachment and detachment with the electrical apparatus.

14. A steering device for rackable electrical apparatus comprising:
    a steerable, wheeled, self-supporting means for lifting a portion of an electrical apparatus to a lifted position and for supporting weight of the lifted apparatus without operator lifting effort, coupled to the lifting bracket; and a lifting bracket having a generally vertically aligned central portion for attachment to the means for lifting, a generally horizontally aligned first flange projecting generally normal from the central portion and a second flange projecting forwardly and downwardly from the central portion, the second flange including a lip projecting therefrom for selective attachment and detachment with the electrical apparatus.

15. The device of claim 14, further comprising a brace coupled to the first and second flanges of the lifting bracket and oriented generally parallel to the central portion thereof.

16. The device of claim 14, further comprising a bumper projecting from the first flange for contact with an electrical apparatus attached to the lifting bracket.

* * * * *